July 31, 1951     A. H. DICKINSON     2,562,531

LINEAR VARIATION OF PHASE OF AN OSCILLATOR

Filed June 23, 1949     5 Sheets—Sheet 1

INVENTOR
Arthur H. Dickinson
BY
AGENT

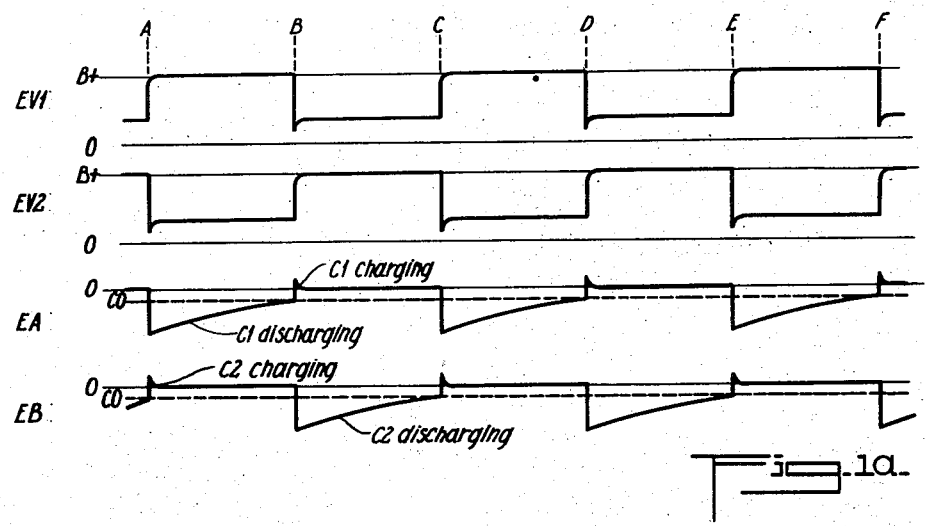
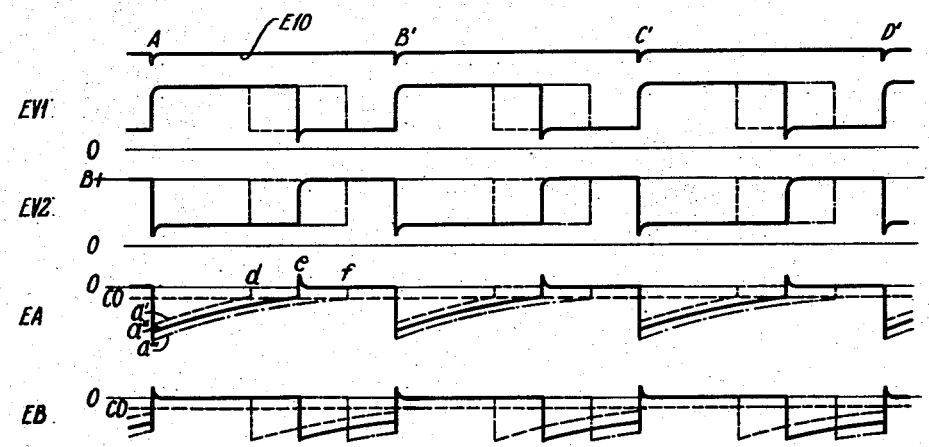

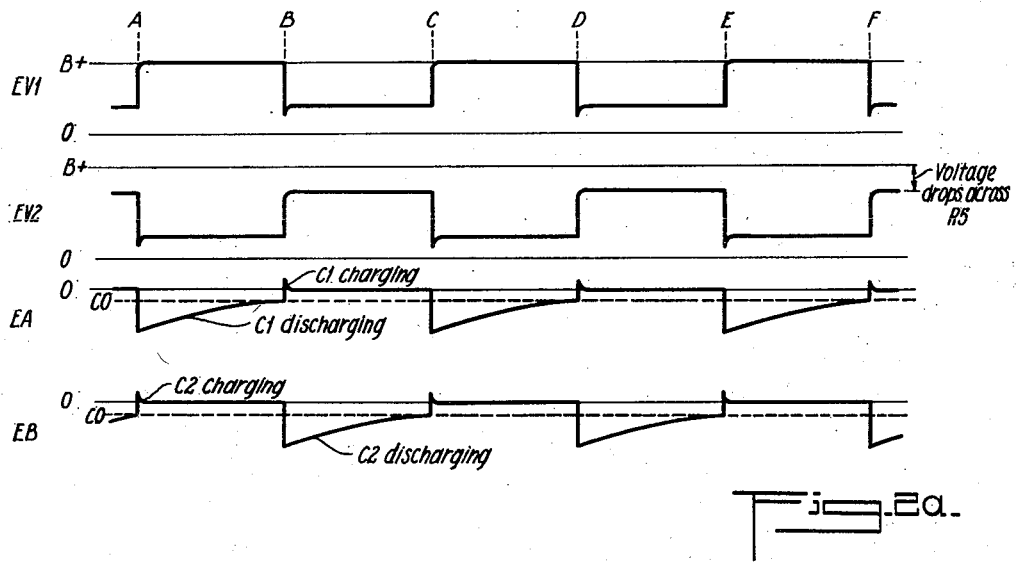
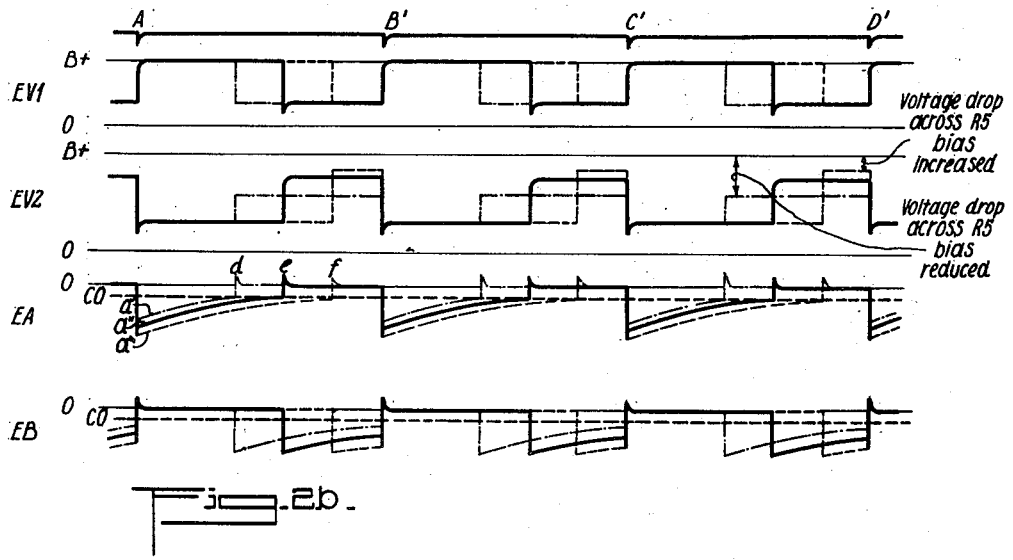

July 31, 1951     A. H. DICKINSON     2,562,531
LINEAR VARIATION OF PHASE OF AN OSCILLATOR
Filed June 23, 1949     5 Sheets-Sheet 5

INVENTOR
Arthur H. Dickinson
BY
C. E. McTiernan
AGENT

Patented July 31, 1951

2,562,531

UNITED STATES PATENT OFFICE 2,562,531

LINEAR VARIATION OF PHASE OF AN OSCILLATOR

Arthur H. Dickinson, Greenwich, Conn., assignor to International Business Machines Corporation, New York, N. Y., a corporation of New York Application June 23, 1949, Serial No. 100,802

5 Claims. (Cl. 332—14)

This invention pertains to an oscillator and more specifically to the methods of phase or angularly modulating an oscillator linearly with respect to a varying phenomena or quantity.

The principal object of this invention is to provide an oscillator that is phase modulated such that the rate of change of phase with respect to a varying potential is a constant.

Another object of this invention is to provide a multivibrator circuit wherein the oscillations thereof are angularly modulated in an inverse linear relationship with respect to a varying quantity.

Another object of this invention is to provide an oscillator which can be linearly phase modulated by equal and oppositely acting adjustable voltage drops generated by a single absolute voltage without affecting the frequency of the oscillator.

This invention is applicable but not restricted to the field of measuring and recording variable quantities such as pressure, humidity and mechanical stresses. The variable quantity in the form of a potential is applied to the grid of a control tube which phase modulates the oscillator such that the rate of change of phase with respect to the change of the variable quantity is a constant.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1a represents the characteristic waveforms of a free running multivibrator.

Fig. 1b represents the characteristic waveforms of the circuit of Fig. 1 obtained during the operation thereof.

Fig. 2a represents the characteristic waveforms of a free running multivibrator.

Fig. 2b represents the characteristic waveforms of the circuit of Fig. 2.

Figure 1:
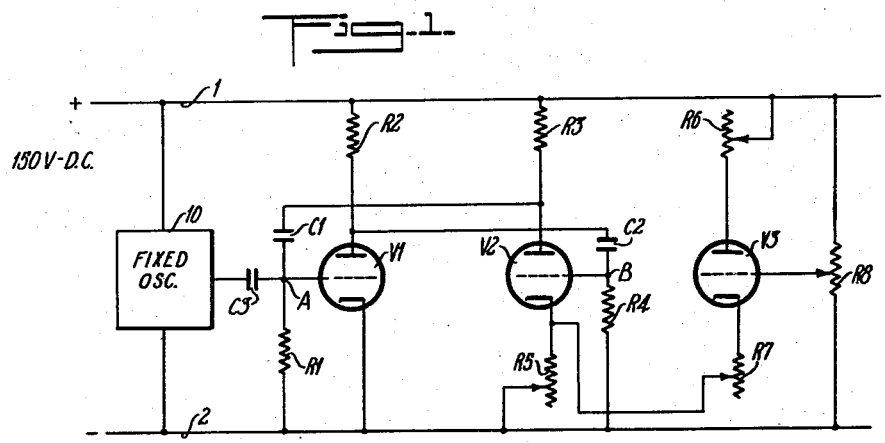
Fig. 1 shows an illustrative circuit arrangement of the main embodiment of the invention wherein the phase modulation of an oscillator varies inversely and linearly with respect to a varying phenomena.

Referring to the drawings, there is shown in Fig. 1 a multivibrator circuit which comprises a pair of triodes V1 and V2 with the grid bias of tube V1 being normally maintained at a zero value while the bias of the tube V2 is negative. While the tubes V1 and V2 are shown as triodes it should be noted that multi-grid tubes may also be used without departing from the scope of the invention. The anodes of the tubes or electron discharge devices V1 and V2 are respectively connected through resistors R2 and R3 to the line 1 which is connected to the high side of a source of D. C. potential. The anode of each tube is cross-coupled through a capacitor C1 and C2, respectively, to the control grid of the other tube. The cathode of tube V1 is connected to line 2 which is connected to the low side of the aforementioned D. C. potential. The cathode of V2 is coupled through the resistor R5 by means of a sliding contact to the line 2 thereby supplying the negative bias to V2. The control grid of each of the tubes V1 and V2 is connected respectively through a resistor R1 and R4 to the power source line 2. An additional voltage drop across the resistor R5 is provided by a circuit which includes potentiometer R6, control tube V3 and the resistor R7. The potentiometer R6 is coupled at one end thereof to the plate of the control tube V3 and at the other end to the line 1 by means of a movable wiper arm. The resistor R7 is connected at one end thereof to the cathode of V3 and at the other end by a sliding connection to the cathode of the tube V2. The grid of the control tube V3 is connected to the movable arm of a potentiometer R8 which is illustrative only of a source of grid voltage for tube V3. To complete the circuit there is provided a fixed oscillator 10 connected across the lines 1 and 2 and capacitively coupled through the capacitor C3 to the junction of the capacitor C1 and the resistor R1. The oscillator 10 synchronizes the operation of the multivibrator by means of a sharp negative pulse applied to the junction of the elements C1 and R1. The frequency of the oscillator 10 is fixed and stable and substantially equal to the frequency of the multivibrator. The circuit of Fig. 1, as described, enables the phase of the switchover period of the driven multivibrator to be controlled by the tube V3 where such phasing is in proportion to a varying phenomena.

Figure 1C:
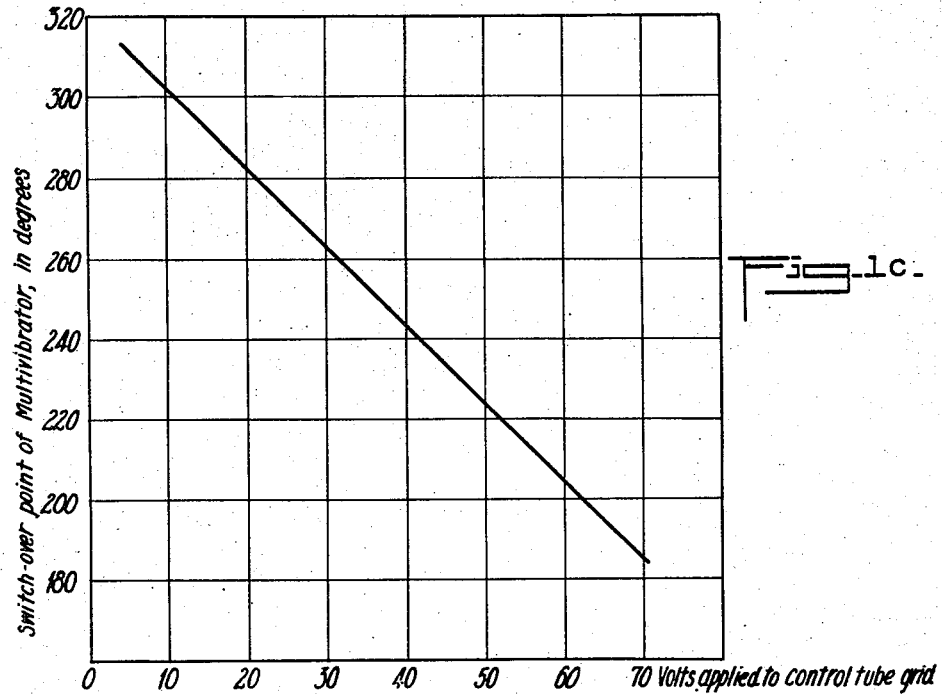
Fig. 1c is a curve showing the linear relationship existing between the shifting of the multivibrator switchover point and the varying quantity.

The operation of the circuit arrangement of Fig. 1 may be best described by referring to Figs. 1a, 1b and 1c. In Fig. 1a there is shown waveforms for a free running multivibrator commencing with the instant A when V2 is conducting and V1 is non-conducting.

In the operation of a free running multivibrator circuit it is well known that each tube of the circuit alternately shifts from conducting to non-conducting status and vice-versa substantially instantaneously because of the cumulative regenerative action of the circuit. Now assuming that the multivibrator tubes V1 and V2 form a free running multivibrator, the waveforms, at the instant when V2 is conducting and V1 is non-conducting, such as at time A, for the voltage at the anode of V1 and V2 would be, respectively, the waveforms EV1 and EV2, of Fig. 1a, while the waveforms for the voltage at the grid of V1 and V2 would be, respectively, EA and EB. These curves show that at the time A the plate voltage of V1 is high with respect to ground when the grid voltage EA of V1 is beyond cut off while the plate voltage of V2 is low with respect to ground when the grid voltage EB of V2 is raised above ground potential. During the time interval A to B when the capacitor C2 is charging, the grid voltage of V2, as represented by EB, decreases to ground potential resulting in the plate voltage of V1, as represented by EV1, approaching the value of the source of the operating potential. At the instant that C2 is charging, the capacitor C1 is discharging resulting in the gradual decrease of the grid voltage of V2, such as shown by waveform EA. At the time when EA reaches the cutoff potential, the switching over action takes place and V1 conducts and V2 is rendered non-conductive at the time interval B. During the time interval B to C, the multivibrator tube V1 is conducting and V2 is non-conducting. At the time C, the circuit flipflops to the original status of V2 conducting and V1 nonconducting.

In Fig. 1b there is shown the waveforms representing the operation of the driven multivibrator of Fig. 1. The curve E10 represents the negative pulse supplied from the oscillator 10 to the multivibrator circuit at fixed intervals of time, such as A, B', C' and D', for the purpose of synchronizing the operation of the multivibrator. The waveforms EV1, EV2, EA and EB represent the plate voltages and grid voltages of tubes V1 and V2, respectively. The solid line waveforms of Fig. 1b represents the cyclic operation of the multivibrator circuit prior to the application of a potential to the grid of the control tube V3. At the instant A when the tube V2 is conducting, a voltage, which is related to the varying quantity, is applied to the grid of V3 resulting in an increase in current flow through V3. As a result of the increase in current flow through the tube V3, there is an increase in the negative bias of V2 accompanied by an increase in the plate voltage of V2 which, in turn, is applied to the grid of V1 rendering it less negative such as point a' appearing on the waveform of EA. This decrease in the grid voltage EA decreases the time for the capacitor C1 to discharge to a voltage value equal to the cutoff potential of V1. Thus V1 remains non-conducting for a lesser time, shown as time interval A to d, that it did prior to the increase in the negative bias when V1 remained non-conducting for the time interval A—e. Thus it is to be noted that the rate of change of the non-conducting period of tube V1 varies inversely and linearly with respect to the absolute voltage applied to the grid of V3. At the time B' the fixed oscillator 10 applies a negative pulse to the conducting tube V1 which revives the non-conducting tube V2 to a conducting status and which, in turn, shuts off V1 thus terminating a cycle of operation. The operating cycle for the multivibrator circuit during the time when there is an increase in the voltage applied to the control grid of the tube V3 is shown in Fig. 1b by the dash line waveform.

When the voltage applied to the tube V3 is reduced, the resulting effect on the grid of V1 is to drive it more negative, as shown by a''' appearing on waveform EA where a'' represents the maximum negative grid voltage attained in the case of the circuit arrangement of Fig. 1 prior to changing the grid voltage of the tube V3. By driving the grid voltage of V1 more negative the time for C1 to discharge is increased so that the crossover point is now positioned at point f on the curve EA. Thus it can be seen that the rate of change of the non-conducting period of V1 with respect to the absolute voltage applied to the grid of V3 is a negative constant, such as shown by the curve of Fig. 1c.

Figure 2:
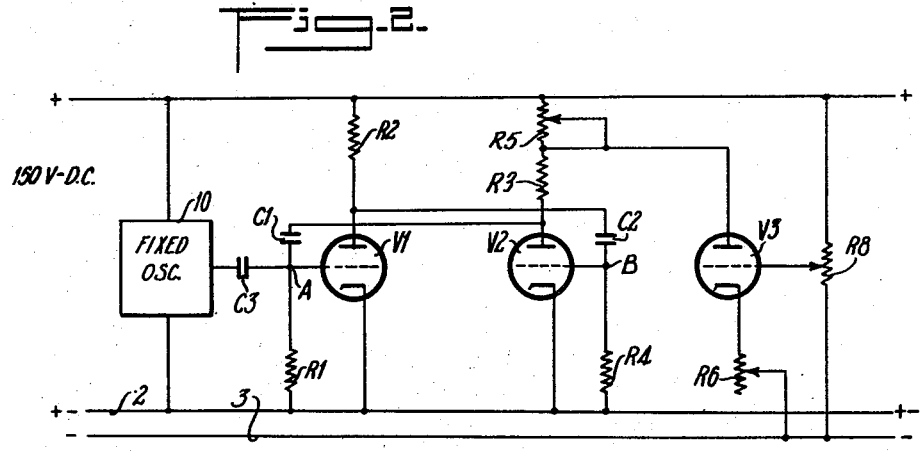
Fig. 2 represents a circuit arrangement forming a modification of the invention wherein the rate of change of the switchover point with respect to an absolute voltage is a negative constant.

In Fig. 2 there is shown another circuit arrangement whereby the phase of the switchover period of an oscillator may be varied linearly with respect to a varying potential. The elements of Fig. 2 which correspond in function to the elements of Fig. 1 are assigned the same reference characters. In this modification the multivibrator tubes V1 and V2 have the respective control grids thereof maintained at a zero bias with the cathode of each tube connected directly to the low side of a source of potential by means of the line 2. The anode of V2 is connected to the high side of a source of potential by means of the line 1 through a series arrangement comprising the resistor R3 and the potentiometer R5. The control tube V3 has the anode thereof connected to the junction of the resistor R3 and the potentiometer R5 in addition to a movable tap coupled to the potentiometer R5. The cathode of V3 is connected through a variable resistor R6 to the line 3 which is connected to the low side of a supplementary source of potential. The high side of the supplementary source of potential is common with the low side of the source of potential feeding the multivibrator circuit. The grid of V3 is connected to a movable arm of a potentiometer R8 which is illustrative only of a source of grid voltage for tube V3.

In Fig. 2a there is shown the waveforms of a free running multivibrator which are the same as those of Fig. 1a with the exception of the curve EV2 wherein it is shown that due to the voltage drop across the resistor R5, the plate voltage of V2 does not equal the value of the source of potential applied thereto during the time interval when V2 is not conducting. In Fig. 2b there is shown the waveforms for the operation of the circuit of Fig. 2 when the grid voltage of V3 is varied beginning with the instant when V2 is conducting.

Figure 2C:
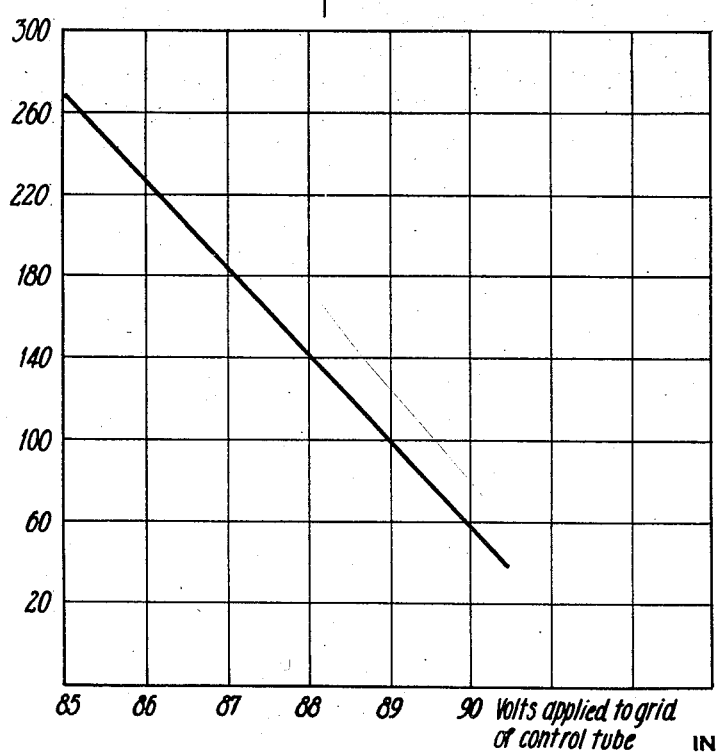
Fig. 2c is a graphical representation showing the linear relationship existing between the phase modulating of the multivibrator and a varying potential.

When the voltage applied to the grid of the control tube V3 is increased, there is an increase in current flow through the elements R5, V3 and R6 resulting in a decrease in the plate supply voltage of V2. This decrease in the plate voltage of V2 is applied to the grid of V1 and renders it less negative, such as $a'$ of the waveform EA of Fig. 2b. As a result of the decrease in the grid voltage, the time for C1 to discharge is reduced resulting in the switchover point moving from position $e$, which is the switchover point for the circuit prior to an increase in the grid voltage of V3, to position $d$. In Fig. 2d the dot-dash line on all the waveforms corresponds to the change in each curve due to the increase in grid voltage applied to V3. The solid line waveform in each instance represents the operation of the circuit prior to a variation in the grid voltage of V3. The increase in the grid voltage results in a decrease in the time when V1 is non-conducting such that the rate of change of the non-conducting period of V1 or the rate of change of the switchover point with respect to the absolute voltage applied to V3 is a negative constant such as shown in Fig. 2c.

When the voltage applied to the grid of V3 is decreased, the resulting effect is to drive the grid more negative, such as $a'''$ of the waveform EA, and to increase the discharge time of C1 such that the switchover point occurs at $f$ on curve EA. The dash line appearing on all the waveforms represents the cyclic operation of the circuit of Fig. 2 when the grid voltage of V3 is decreased. Here also the rate of change of the non-conducting period of V1 varies linearly in an inverse relationship with respect to the absolute voltage applied to the grid of V3.

The negative pulses B' and C' supplied by the fixed oscillator 10 terminates each cycle by rendering V2 conductive and V1 non-conductive.

Figure 3:
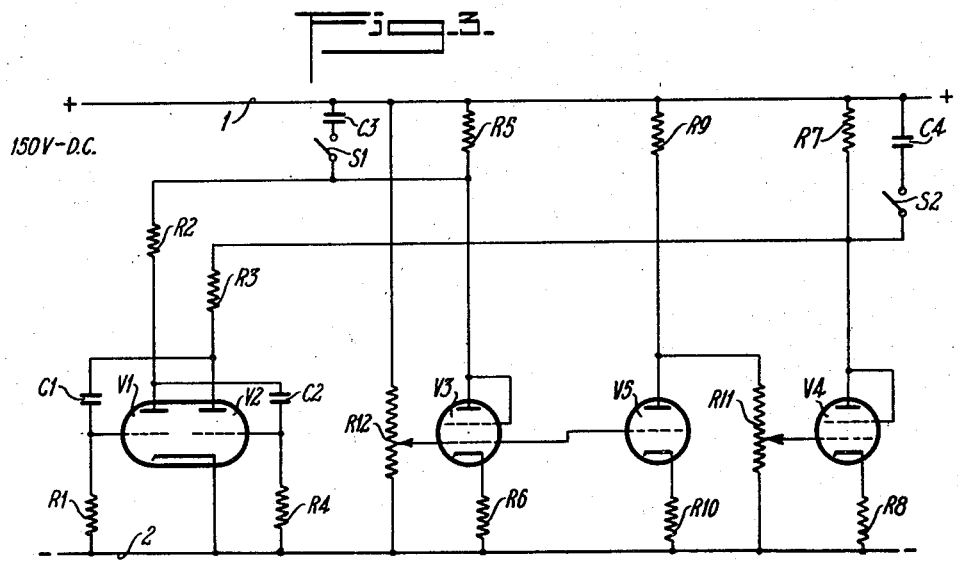
Fig. 3 is a circuit arrangement showing another modification of phase modulating an oscillator by equal and oppositely acting adjustable voltage drops generated by a single absolute voltage.

Another modification of the invention is shown in Fig. 3 where there is shown a circuit for angularly modulating an oscillator by equal and oppositely acting adjustable voltage drops generated by a single absolute voltage without affecting the frequency of the oscillator. It is to be noted that the fixed oscillator of the previous embodiments of the invention has been dispensed with due to the fact that the circuit is evenly balanced and any tendency of the multivibrator to drift would be compensated for by the circuit itself.

In Fig. 3 there is shown a pair of multivibrator tubes V1 and V2 having a common cathode connected to the line 2 which is coupled to the low side of a source of operating potential, not shown. While a tube having a common cathode is shown, such as a duo-triode, the invention is not restricted thereto since two separate tubes could also be used without departing from the scope of the invention. The anodes of V1 and V2 are cross-coupled respectively through the capacitors C1 and C2 to the control grid of the other tube. The grid of each tube is connected by grid resistors R1 and R4, respectively, to the line 2. The anode of V1 is connected to the line 1, which is connected to the positive side of a source of potential, through a pair of series resistors R2 and R5 with the latter resistor shunted by a capacitor C3 when the switch S1 is closed. The anode of the multivibrator tube V2 is connected through a pair of series resistors R3 and R7 to the line 1 with the latter resistor being shunted by the capacitor C4 when the switch S1 is closed. The control tube V3 is connected across the lines 1 and 2 with the anode and screen grid thereof connected to the junction of the resistors R2 and R5. The cathode of V3 is connected through the resistor R6 to the line 2. The control grid of V3 is connected to the movable arm of a potentiometer R12 which is illustrative only of a source of grid voltage for the control tubes V3 and V5.

The tube V4 is also connected across the lines 1 and 2 with the plate and screen grid thereof commonly connected to the junction of the resistors R3 and R7. The cathode of V4 is connected through a resistor R8 to the line 2 while the control grid thereof is connected to the movable arm of potentiometer R11. The tube V5 is connected across the lines 1 and 2 with the anode thereof connected through the resistor R9 to the line 1 while the cathode is connected through the resistor R10 to line 2 with the potentiometer R11 shunting the tube V5 and the resistor R10. The grid of V5 is coupled to the movable arm of the potentiometer R12 as is the grid of the tube V3.

When the voltage applied to the control grid of V3 and V5 is increased due to a change of the varying quantity as represented by the potentiometer R12, there is a corresponding increase in current flow through the elements R5, V3 and R6 and R9, V5, and R10 with a resulting decrease in current flow through the potentiometer R11. The increase in current flow through R5 decreases the anode voltage of the tube V1 which when V1 is conducting decreases the current flow through R2 and V1. The decrease in the anode voltage of V1 upon being applied to the grid of V2 causes the grid to go less negative with respect to line 2. As a result a shorter time is required for C2 to discharge to the voltage value equal to the cutoff potential of V2. Thus the multivibrator tube V2 remains non-conducting for a lesser time than it did prior to the decrease in the plate supply voltage of V1.

The decrease in voltage across R11 decreases the voltage applied to the control tube V4 resulting in a decrease in current flow through R7, V4 and R8. The decrease in current flow through R7 increases the plate supply voltage of V2 resulting in an increase in current flow through V2 and R3 when V2 is conducting. When V2 is conducting the increased plate supply voltage thereof drives the grid of V1 more negative. Thus a longer time is required for C1 to discharge to a voltage value equal to the cutoff potential of V1 resulting in V1 remaining non-conducting for a greater time than it did prior to the increase in the plate supply voltage of V2.

When the voltage supplied by the potentiometer R12 and which is applied to the grid of the control tubes is decreased, the current flow through R5, V3 and R6 and R9, V5 and R10 decreases while the current flow through R11 increases. Accordingly, the voltage applied to the grid of V4 increases, resulting in an increased current flow through R7, V4 and R8. Thus the effective plate supply voltages applied to the multi-vibrator tubes V1 and V2 increase and decrease, respectively. Hence, the non-conducting period of V2 increases while that of V1 decreases. It is thus seen that the circuit arrangement comprising tubes V3, V4 and V5 and related circuits comprises means for producing two adjustable voltage drops, one increasing as the other decreases, and vice-versa. The proper choice and adjustment of the circuit parameters result in equal, opposite and uniform changes across the resistors R5 and R7 as the absolute voltage derived from R12 changes uniformly.

Figure 3A:
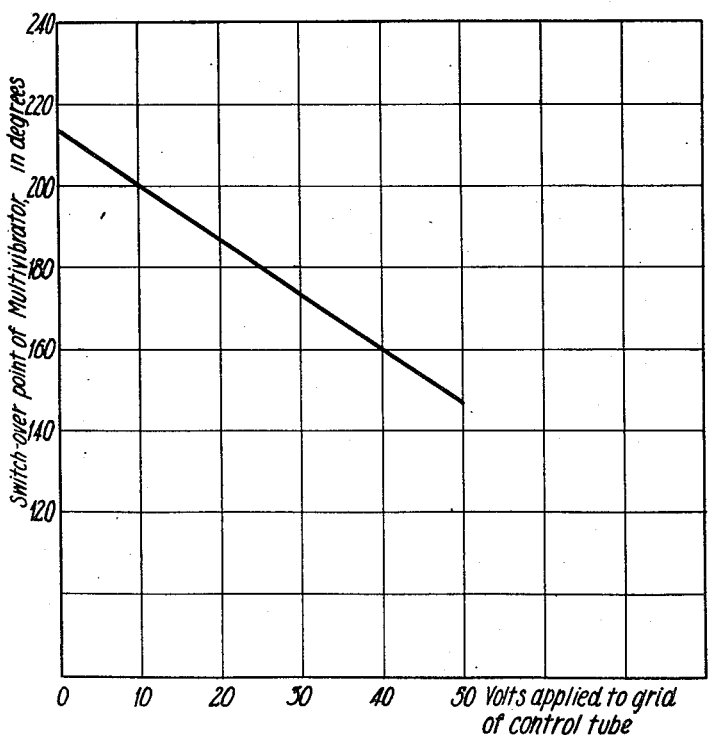
Fig. 3a is a curve showing the linearity obtained in the phase modulating of the oscillator upon the application of a varying quantity to the grid of a control tube.

The two adjustable voltage drops cause the plate supply voltages for tubes V1 and V2 to vary equally and oppositely and as long as this condition is maintained the frequency of the oscillator remains unchanged. The variation of the plate voltage of tubes V1 and V2 results in a change of phase of the switchover point such that the rate of change of the non-conducting period of V1 with respect to the absolute voltage is a constant such as shown by Fig. 3a.

It has been found that increasing the size of the grid resistors R1 and R4 increases the total amount of phase or angle through which the switchover point may be adjusted. The inclusion of the capacitors C3 and C4 in the circuit, when S1 and S2 are closed, not only produces a stabilizing effect but also has the same effect as increasing the values of R1 and R4.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for phase modulating a multivibrator in accordance with an absolute voltage comprising, a first and second electron discharge device each having a cathode, an anode and a control electrode, a source of potential having a positive and negative terminal, a pair of series resistors connected between each anode and the positive terminal, one of a plurality of electron discharge devices coupled to the junction of the series resistors of the first device, a third electron discharge device coupled to the junction of the series resistors of the second device, means for coupling the other of said plurality of devices to said third device, a variable potential responsive to an external condition coupled to said plurality of devices whereby a change in said variable potential produces equal and oppositely acting voltage drops which linearly changes the phase of the switchover point of said multivibrator, the frequency of said multivibrator being unaffected thereby.

2. Apparatus for phase modulating an oscillator comprising a first and second electron discharge device, each of said devices having an anode, a control grid and a common cathode, a positive and negative terminal connected to a source of energy, the anode of each device capacitively coupled to the grid of the other device, the common cathode being directly connected to the negative terminal, a grid leak resistor connected between the grid of each device and said negative terminal, a first and second resistor connected in series between the anode of each device and the positive terminal, a source of variable potential connected across said terminals, a plurality of electron discharge devices each having an anode, a cathode and a control electrode, the anode of one of said plurality of devices connected to the junction of said first and second resistor of said first device, the anode of the other of said plurality of devices connected through a resistor to the positive terminal and through a potentiometer to the negative terminal, the electrode of each of said plurality of devices being coupled to said variable potential whereby when said variable potential fluctuates an adjustable voltage is applied to said first device, a third electron discharge device having an anode, a cathode and a control grid, the anode of said third device being coupled to the junction of said first and second resistors of said second device, the cathode of said third device being coupled through a resistor to the negative terminal, the grid of said third device being coupled to said potentiometer by a movable arm whereby when said variable potential fluctuates an adjustable voltage is applied to said second device which is equal and opposite to the adjustable voltage applied to said first device, the frequency of said oscillator being unaffected by the variation in voltage of said first and second device, the phase of the switchover point linearly and inversely varying with respect to the change of said variable potential.

3. In a system for phase modulating a multivibrator comprising a first and second electron discharge means each having an anode, a cathode and a control grid, means cross-coupling the anode of each device with the control grid of the other device, a main power source means having a positive and negative terminal, the cathode of each of said discharge means being coupled to said negative terminal, the control grid of each of said discharge means being coupled through a resistor to said negative terminal, the anode of the first means being connected through a resistor to said positive terminal, the anode of said second means being coupled to the positive terminal through a resistor and a potentiometer connected in series, a supplementing power source means having a high and low side, a variable potential coupled between said positive terminal and said low side, electron tube control means having a plate, a control electrode and a cathode, means coupling said cathode of said control means to said low side, means coupling said plate to the resistor and potentiometer in the anode circuit of said second discharge means, said control electrode being movably coupled to said variable potential whereby a variation of said potential induces a change in the anode voltage of said second discharge means whereby the switchover point of said multivibrator varies linearly and inversely with respect to said potential variation.

4. Apparatus for phase modulating a multivibrator in accordance with an absolute voltage comprising multivibrator circuit means including a first and second electron discharge device each having an anode impedance, a third, fourth, and fifth electron discharge devices having a cathode, an anode, a control grid, and an anode impedance, a source of variable potential representative of a varying phenomena, means coupling said first device to the anode of said third device, means coupling said second device to the anode of said fifth device, means commonly coupling said third and fourth devices to said variable potential, said variable potential inducing a current flow in said third device causing an inverse change in the anode potential of said first device, means coupling said fourth device to said fifth device inducing a current flow through said fifth device causing a variation in anode potential of said second device which is inverse to said potential change of said first device whereby the phase of the switchover point of said multivibrator is made to vary.

5. Apparatus for phase modulating a multivibrator in accordance with an absolute voltage comprising a multivibrator circuit means having a pair of electron discharge devices, a source of variable potential representative of a varying condition, means coupling said variable potential to one of said devices causing an inverse change in the anode potential of said one of said devices, means coupling said variable potential to the other of said devices causing a direct change in the anode potential of said other of said devices, said potential changes of said devices being equal and opposite and causing the output of said circuit to be phase modulated.

ARTHUR H. DICKINSON.

REFERENCES CITED

The following references are of record in the file of this patent:

UNITED STATES PATENTS

| Number | Name | Date |
|---|---|---|
| 2,432,204 | Miller | Dec. 9, 1947 |
| 2,443,922 | Moore | June 22, 1948 |